(12) United States Patent
Yamamoto et al.

(10) Patent No.: US 6,170,998 B1
(45) Date of Patent: *Jan. 9, 2001

(54) PROCESSOR WHICH RETURNS FROM A SUBROUTINE AT HIGH SPEED AND A PROGRAM TRANSLATING APPARATUS WHICH GENERATES MACHINE PROGRAMS THAT MAKES A HIGH-SPEED RETURN FROM A SUBROUTINE

(75) Inventors: Kazushi Yamamoto, Osaka; Shuichi Takayama, Takarazuka; Nobuo Higaki, Osaka; Nobuki Tominaga, Kyoto; Shinya Miyaji, Nara, all of (JP)

(73) Assignee: Matsushita Electric Industrial Co., Ltd., Osaka-Fu (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/589,854

(22) Filed: Jan. 22, 1996

(30) Foreign Application Priority Data

May 11, 1995 (JP) .................................................... 7-113455

(51) Int. Cl.[7] ........................................................ G06F 9/45
(52) U.S. Cl. ........................................................ 395/701
(58) Field of Search .................................... 395/702, 703, 395/704, 705, 706, 707, 708, 709, 183.14, 344; 717/704

(56) References Cited

U.S. PATENT DOCUMENTS 4,399,507 * 8/1983 Cosgrove et al. ................... 712/219
4,954,947 * 9/1990 Kuriyama et al. ................... 395/394
5,117,498 * 5/1992 Miller et al. .......................... 395/775
5,222,220 * 6/1993 Mehta .............................. 395/183.14
5,579,520 * 11/1996 Bennett ................................ 395/704
5,598,560 * 1/1997 Benson ................................. 395/707
5,701,449 * 12/1997 Matsuo et al. ....................... 712/239
5,867,696 * 2/1999 Okayama et al. ................... 712/233

FOREIGN PATENT DOCUMENTS

068163 * 5/1983 (EP) .
565194 * 6/1993 (EP) .
55133 * 1/1993 (JP) .

OTHER PUBLICATIONS

"Inside Intel's i960CA Superscalar Processor", by S. McGeady, 2407 Microprocessors and Microsystems, 14 (1990) Jul./Aug., No. 6.*

* cited by examiner

Primary Examiner—Alvin E. Oberley
Assistant Examiner—Peter Stecher
(74) Attorney, Agent, or Firm—Price and Gess

(57) ABSTRACT

A processor detects a function which includes no function call instruction and no update of the return address /calculation register from an assembler program. After the detection, the processor outputs a special return address to the end of the function detected, and executes the assembler program. The processor stores a return address not only on the stack but in the return address/calculation register. When the special return instruction has been fetched, the return address is moved from the return address/calculation register without accessing to the stack.

17 Claims, 12 Drawing Sheets

FIG. 1 jsr _f1 :   function call instruction
① SP−2−>SP
② address of next instruction −>@SP
③ address of next instruction −>FR
④ #_f1(address of f1)   −>PC rts :   return instruction
① @SP−>  PC
② SP+2−>SP rtsfr :   special return instruction
① FR−>  PC
② SP+2−>SP Dn,Dm : registers
imm : immediate value
PC : program counter
@SP : stack
FR : return-address-only register
MR : calculation register add  Dn,Dm :   add instruction
| 0001 | + | 0010 | ⟶ | 0011 |
   Dn        Dm              Dm mov  Dn,Dm :   move instruction
       | 0010 | ⟶ | 0010 |
          Dn              Dm mov  #imm,Dm :
       #10 ⟶ | 0010 |
    (immediate value)  Dm mul  Dn,Dm : multiplication instruction   multiplication result
multiplier  multiplicand                   high order bits  low order bits
| 0002 | × | 8000 | ⟶ | 0001 | 0000 |
   Dn         Dm              MR      Dm

FIG. 2 addresses

| | _main | | | |
|---|---|---|---|---|
| 0100 | mov | #1,D0 | (ex1) | main |
| 0101 | jsr | _f1 | (ex2) | |
| 0102 | mov | #2,D0 | (ex3) | |
| 0103 | jsr | _f3 | (ex4) | |
| 0104 | rts | | (ex5) | |
| _f1 | | | | f1 |
| 0105 | mov | #1,D1 | (ex6) | |
| 0106 | add | D1,D0 | (ex7) | |
| 0107 | jsr | _f2 | (ex8) | |
| 0108 | rts | | (ex9) | |
| _f2 | | | | f2 |
| 0109 | mov | #3,D1 | (ex10) | |
| 010a | mul | D0,D1 | (ex11) | |
| 010b | add | D0,D1 | (ex12) | |
| 010c | rtsfr | | (ex13) | |
| _f3 | | | | f3 |
| 010d | mov | #1,D1 | (ex14) | |
| 010e | add | D1,D0 | (ex15) | |
| 010f | rtsfr | | (ex16) | |

FIG. 5

| source program | assembler program | | | |
|---|---|---|---|---|
| main () { | | | | |
|    f1(1) ; | f1(1) { mov | #1,D0 | (ex1) | ⎫ |
|    f3(2) ; |        { jsr | _f1 | (ex2) | ⎪ |
| } | f3(2) { mov | #2,D0 | (ex3) | ⎬ main |
| |        { jsr | _f3 | (ex4) | ⎪ |
| | rt | | (ex5) | ⎭ |
| f1(int a) { | | | | |
|    a=a+1 ; | a=a+1 { mov | #1,D1 | (ex6) | ⎫ |
|    f2 (a) ; |         { add | D1,D0 | (ex7) | ⎬ f1 |
| } | f2 (a) { jsr | _f2 | (ex8) | ⎪ |
| | rts | | (ex9) | ⎭ |
| f2(int a) { | | | | |
|    int b ; | | | | |
|    b=a*3 ; | b=a*3 { mov | #3,D1 | (ex10) | ⎫ |
|    b=a+b ; |         { mul | D0,D1 | (ex11) | ⎬ f2 |
| } | b=a+b { add | D0,D1 | (ex12) | ⎪ |
| | rts | | (ex13) | ⎭ |
| f3(int a) { | | | | |
|    a=a+1 ; | a=a+1 { mov | #1,D1 | (ex14) | ⎫ |
| } |         { add | D1,D0 | (ex15) | ⎬ f3 |
| | rts | | (ex16) | ⎭ |

FIG. 6 add Dn,Dm : add instruction

| 0001 | + | 0010 | → | 0011 |
Dn        Dm            Dm mov Dn,Dm : move instruction

| 0010 | → | 0011 |
Dn            Dm mov #imm,Dm :

10 → | 0010 |
(immediate value)    Dm mul Dn,Dm : multiplication instruction   multiplication result multiplier   multiplicand              high order bits  low order bits

| 0002 | × | 8000 | → | 0001 | 0000 |
Dn          Dm              MR      Dm jsr _f1 :   function call instruction
 ①SP−2−>SP
 ②address of next instruction−>@SP
 ③address of next instruction−>MR
 ④#_f1(address of f1)  −>PC rts :        return instruction
 ①@SP−>  PC
 ②SP+2−> SP rtsf :       special return instruction
 ①MR−>  PC
 ②SP+2−>SP Dn,Dm : registers
    #imm : immediate value
    PC : program counter
    @SP : stack
    MR : calculation register

FIG. 8 addresses

| | _main | | | |
|---|---|---|---|---|
| 0100 | mov | #1,D0 | (ex1) | main |
| 0101 | jsr | _f1 | (ex2) | |
| 0102 | mov | #2,D0 | (ex3) | |
| 0103 | jsr | _f3 | (ex4) | |
| 0104 | rts | | (ex5) | |
| _f1 | | | | f1 |
| 0105 | mov | #1,D1 | (ex6) | |
| 0106 | add | D1,D0 | (ex7) | |
| 0107 | jsr | _f2 | (ex8) | |
| 0108 | rts | | (ex9) | |
| _f2 | | | | f2 |
| 0109 | mov | #3,D1 | (ex10) | |
| 010a | mul | D0,D1 | (ex11) | |
| 010b | add | D0,D1 | (ex12) | |
| 010c | rts | | (ex13) | |
| _f3 | | | | f3 |
| 010d | mov | #1,D1 | (ex14) | |
| 010e | add | D1,D0 | (ex15) | |
| 010f | rts | | (ex16) | |

PROCESSOR WHICH RETURNS FROM A SUBROUTINE AT HIGH SPEED AND A PROGRAM TRANSLATING APPARATUS WHICH GENERATES MACHINE PROGRAMS THAT MAKES A HIGH-SPEED RETURN FROM A SUBROUTINE

BACKGROUND OF THE INVENTION (1) Field of the Invention

The present invention relates to a processor, and an apparatus for translating a source program written in a programming language into a machine program suitable for the processor.

(2) Description of the Related Art

Recently, information apparatuses with a built-in micro processor have been developed to respond to various needs. The development of these information apparatuses is focused on speeding up their process and reducing their cost from both hardware and software.

In the software, the process is expressed by using many subroutines which are nested to several levels. In order to call a subroutine, a return address is stored on a stack, and in order to return to the original program from the subroutine, the return address is moved from the stack to a program counter.

The time to access the stack to fetch the return address is ignorable when a program has only a few subroutine calls; however, when there are dozens of subroutine calls, the access time of the stack causes delays in the operations of the processor.

In order to avoid the delays to be caused by the access time of the stack, a conventional processor is provided with a register specifically designed to store a return address. The register is hereinafter referred to as the return-address-only register.

FIG. 1 shows a list of instructions to be used in the conventional processor. In the list, SP, @SP, and FR represent a stack pointer, a reference to a stack, and the return-address-only register, respectively.

The instruction: jsr _f is a subroutine call instruction, and indicates that a return address is stored not only on a stack like an ordinary subroutine call instruction but also in the return-address-only register. When the processor has fetched a subroutine call instruction from a stack, the processor subtracts 2 from a stack pointer value, and stores the address of an instruction which immediately follows the subroutine call instruction on the stack which is indicated by the stack pointer and in the return-address-only register.

The instruction: rts is a return instruction, and indicates that a return address on a stack is moved to a program counter, 2 is added to the stack pointer value, and the processor returns to the original program in the same manner as an ordinary return instruction.

The instruction: rtsfr is also a return instruction, but indicates that a return address is moved not from the stack but from the return-address-only register to the program counter. Such an instruction as obtains a return address from a stack is referred to as a special return instruction.

The other instructions on the list such as an add instruction and a mul instruction are not explained because they are not directly related to the present invention.

The operations of the processor provided with the return-address-only register to jump to a subroutine and to return from a subroutine will be described with reference to FIGS. 2 and 3.

FIG. 2 shows a list of output codes of an assembler program, and the entrance locations of functions are labeled with either _main, _f1, or _f2. Hereinafter, functions are referred to subroutines.

In the program, a special return instruction exists at the end of a function which involves no function call. In other words, it exists in a function which is located at the deepest level of nesting. This is because the return-address-only register stores only one return address while a stack is organized on a First In-Last Out basis.

The instructions are assigned respective addresses such as 0100 or 0101 shown on the left and respective identifiers (ex1)–(ex16) shown on the right.

FIG. 3 shows a flowchart which depicts how the conventional processor calls a subroutine and returns from a subroutine.

It is assumed that the address 0100 of the instruction with (ex1) is set at the program counter.

At u1, whether there is a next instruction to be fetched is determined. If there is, the process proceeds to u2 and otherwise terminates the process. Since the next instruction with (ex1) exists in this case, the process proceeds to u2, and further proceeds to u3, u4, and u5 to execute the instruction with (ex1), and the process returns to u1. At u1, it is determined that there is a next instruction to be fetched. At u2, the instruction with (ex2) is fetched. At u3, whether the instruction is a function call instruction is determined. If it is, the process proceeds to u6 and otherwise proceeds to u4. Since the instruction with (ex2): jsr _f1 is a function call instruction, the process proceeds to u6. At u6, the address 0102 of the next instruction with (ex3) is stored on the stack as a return address. At u7, the address 0102 is also stored in the return-address-only register, and a function f1 is called. Then, the process returns to u1 to fetch and execute the consecutive instructions with (ex6) and (ex7) of the function f1.

After the execution of the instruction with (ex7), it is determined that the next instruction with (ex8) exists at u1 and the instruction with (ex8) is fetched at u2. It is determined that the instruction with (ex8): jsr _f2 is a function cal instruction at u3, and the address 0108 of the next instruction with (ex9) is stored on the stack as a return address at u6. The address 0108 is also stored in the return-address-only register, and the function f2 is called at u7.

The consecutive instructions with (ex10)–(ex12) of the function f2 are fetched and executed at u1–u5.

After the execution of the instruction with (ex12), it is determined that the next instruction with (ex13) exists at u1 and the instruction is fetched at u2. It is determined that the instruction with (ex13) is not a function cal instruction at u3, and the process proceeds to u4. At u4, whether the instruction with (ex13) is a special return instruction is determined. If it is, the process proceeds to u8 and otherwise proceeds to u5. Since the instruction with (ex13): rtsfr is a special return instruction, the process proceeds to u8. At u8, the address 0108 of the next instruction with (ex9) is moved from the return-address-only register to the program counter, and as a result, the function f1 is resumed without access to a stack.

Then, it is determined at u1 that the return instruction with (ex9) exists, and the instruction is fetched at u2. The process proceeds to u3, u4, and u5 where the return instruction with (ex9) is executed. That is, the processor accesses the stack and fetches the address 0102 of the instruction with (ex3) and exits from the function f1.

Since the next instruction with (ex4):jsr _f3 is a function call instruction, the address 0104 of the next instruction with (ex5) is stored on the stack at u6, and also stored in the return-address-only register to call the function f3 at u7. Then, the consecutive instructions with (ex14) and (ex15) are fetched and executed at u1–u5. The next instruction with (ex16): rtsfr is fetched at u2 and the address 0104 of the next instruction (ex5) is moved from the return-address-only register to the program counter to return to the function f1 at u8.

As explained hereinbefore, the conventional processor provided with the return-address-only register exits from a subroutine and returns to the original program, by making use of the return-address-only register instead of accessing to a stack in the case where there is a special return instruction.

As a result, the speed of returning from a subroutine is heightened.

However, the conventional processor provided with the return-address-only register still has a drawback that its circuit must be large to have enough space to accommodate the return-address-only register.

SUMMARY OF THE INVENTION

A first object of the present invention is to provide a processor which returns from a subroutine at a high speed without providing a return-address-only register.

A second object of the present invention is to provide a program translating apparatus for translating a source program written in a programming language into a machine program suitable for the processor.

The first object is achieved by a processor which is provided with a fetch unit for sequentially fetching instructions from memory, a decode unit for decoding the instructions fetched by the fetch unit, a calculator for, when a predetermined calculation instruction is included in the instructions fetched, calculating the predetermined calculation instruction, and a special register for storing a calculation result of the predetermined calculation instruction. The decode unit comprises the following units:

a first determination unit for determining whether each of the instructions fetched by the fetch unit is a subroutine call instruction;

a second determination unit for determining whether each of the instructions fetched by the fetch unit is a first subroutine return instruction for returning a return address from a stack; and a third determination unit for determining whether each of the instructions fetched by the fetch unit is a second subroutine return instruction for returning a return address from the special register.

The processor comprises the following units:

a call unit for, when the first determination unit has determined an instruction to be a subroutine call instruction, storing an address of an instruction which follows the subroutine call instruction to the stack and the special register as a return address;

a first return unit for, when the second determination unit has determined an instruction to be a first subroutine return instruction, returning the return address from the stack to a program counter; and a second return unit for, when the third determination unit has determined an instruction to be a second subroutine return instruction, returning the return address from the special register to the program counter.

In the processor, when a subroutine call instruction has been fetched, the address of the next instruction is stored as a return address on the stack and the special register. When the second subroutine return instruction has been fetched, the return address is moved from the special register to the program counter. Therefore, the number of access to the stack can be reduced without providing a register specifically designed to store a return address. Consequently, a processor which returns from a subroutine at a high speed and which is not provided with the register specifically designed to store a return address is produced a low cost.

The special register may store calculation results of either multiplication operations, division operations, or residue operations of the calculator.

Since these operations have a low frequency of use in a called subroutine, returns from subroutines which do not include these operations are made possible by using the special register.

The special register may store calculation results whose bit lengths are longer than a bit length of the calculator.

Since these operations have a low frequency of use in a called subroutine, returns from subroutines which do not include these operations are made possible by using the special register.

The special register may store either the high order bits or the low order bits of calculation results of the calculator.

Such a register has a low frequency of use in a called subroutine, in the case where the processor processes a machine program produced from a source language written in a programming language. Therefore, returns from more subroutines are made possible by using the special register, and as a result, the number of access to the stack can be reduced.

The second object can be achieved by a program translating apparatus for generating machine programs each composed of a plurality of subroutines and rewriting the machine programs generated, each of the plurality of subroutines including a first subroutine return instruction for returning a return address from a stack, and part of the plurality of subroutines including one of a subroutine call instruction and a predetermined calculation instruction whose calculation result is stored in a special register. The program translating apparatus comprises the following units:

a fetch unit for fetching all the plurality of subroutines one by one;

a determination unit for determining whether each of all the plurality of subroutines fetched by the fetch unit includes neither the subroutine call instruction nor the predetermined calculation instruction;

a detection unit for detecting the first subroutine return instruction from each subroutine that has been determined not to include neither the subroutine call instruction nor the predetermined calculation instruction by the determination unit; and a rewrite unit for rewriting the first subroutine return instruction detected by the detection unit into a second subroutine return instruction for returning a return address from the special register.

In the program translating apparatus, the first subroutine return instruction is rewritten into the second subroutine return instruction, so that a machine program where a return address is fetched from the special register is produced.

Therefore, the machine program to be produced by the program translating apparatus can make the processor store a return address in the special register.

Consequently, the machine program can use a single register to store both a return address and calculation results, and there is no need to provide a return-address-only register.

The predetermined calculation instruction may be either a multiplication operation, a division operation, or a residue operation.

Since the first subroutine call instruction of a subroutine where these operations have a low frequency of use is rewritten into the second subroutine call instruction, a machine program rewritten can make the processor return from subroutines which do not include these operations by using the special register.

The predetermined calculation instruction may have a bit length longer than a calculator of a processor.

Since the first subroutine call instruction of a subroutine where these operations have a low frequency of use is rewritten into the second subroutine call instruction, a machine program rewritten can make the processor return from subroutines which do not include these operations by using the special register.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows a list of instructions to be used in the conventional processor.

FIG. 2 shows a list of output codes of an assembler program.

FIG. 5 shows the relationship between a source program and an assembler program produced from the source program.

FIG. 6 shows a list of instructions to be used in the processor of the present invention.

FIG. 8 shows instructions of the assembler program shown in FIG. 5.

DESCRIPTION OF THE PREFERRED EMBODIMENT

<The program translating apparatus of the present embodiment>

Figure 3:
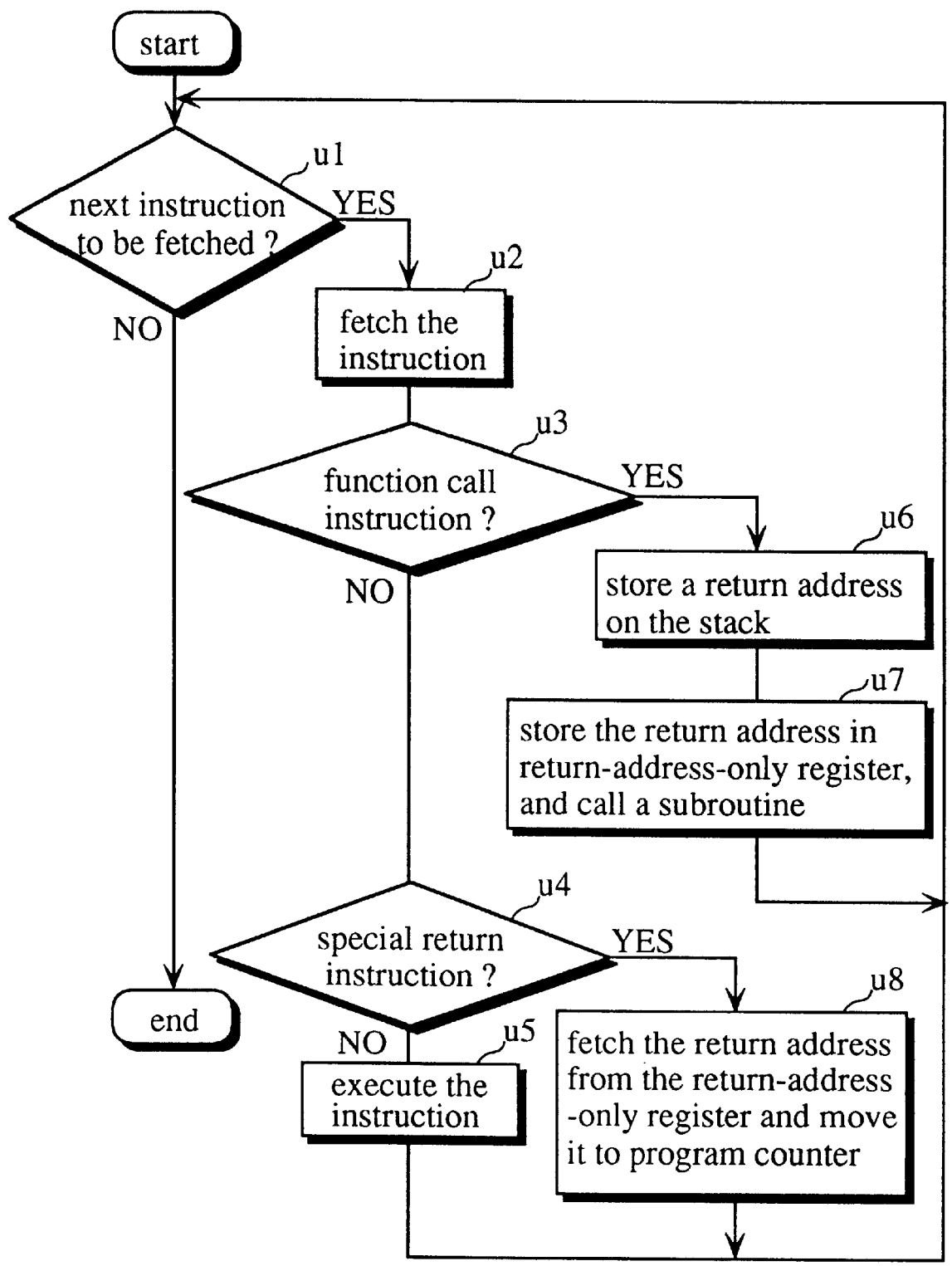
FIG. 3 shows a flowchart which depicts how the conventional processor calls a subroutine and returns from the subroutine.
Figure 4:
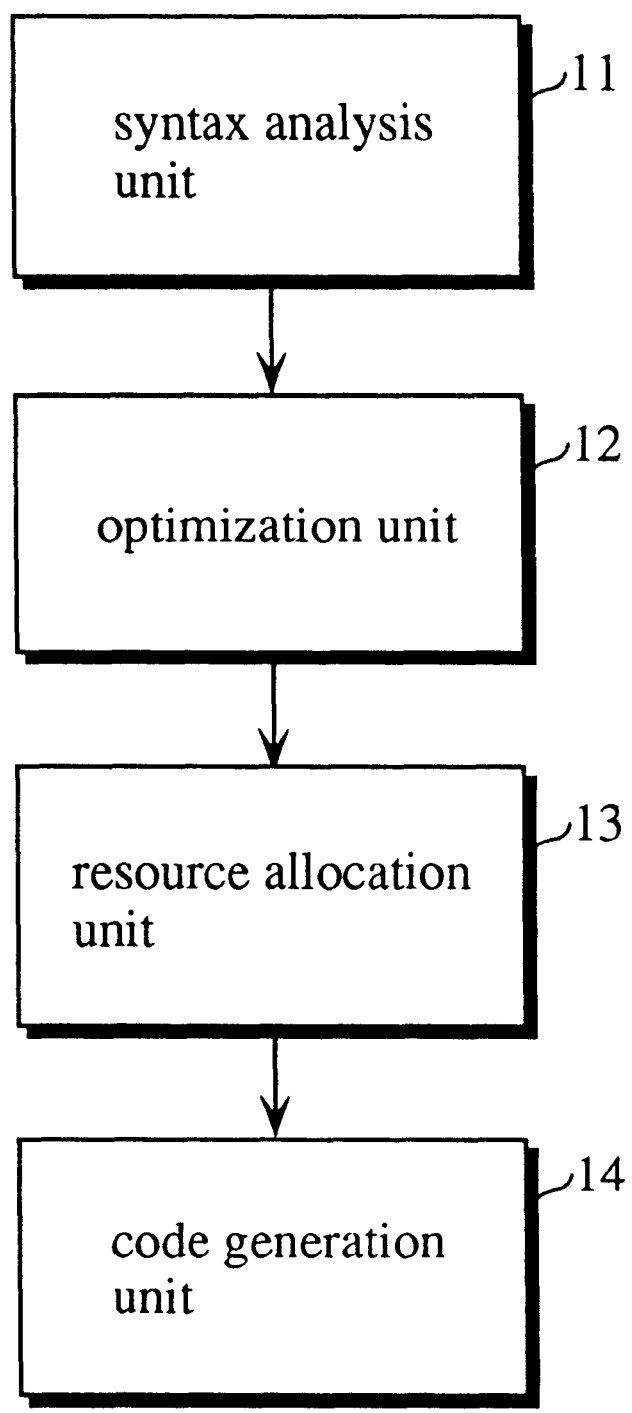
FIG. 4 shows the construction of the program translating apparatus of the present embodiment.

FIG. 4 shows the construction of the program translating apparatus of the present embodiment. The apparatus includes a syntax analysis unit 11, an optimization unit 12, a resource allocation unit 13, and a code generation unit 14.

The syntax analysis unit 11 performs a lexical analysis, a syntax analysis, and a semantic analysis of a source program which is stored as a file in an unillustrated storage unit, and converts the source program into an intermediate program.

The optimization unit 12 performs optimization of the intermediate program for the purpose of reducing the size and the process time of an assembler program which is produced from the intermediate program. The optimization includes a blocking, a control flow analysis, and a data flow analysis. The blocking refers to dividing an intermediate program to be processed into basic blocks.

The dividing operation is performed as follows: the optimization unit 12 detects from an intermediate program an initial intermediate instruction, a conditional or non-conditional jump target intermediate instruction, and an intermediate instruction which immediately follows a conditional or non-conditional jump target intermediate instruction, and regards these instructions detected as leaders.

Then, the optimization unit 12 extracts a series of intermediate instructions from a leader until an intermediate instruction which immediately proceeds another leader, and these consecutive intermediate instructions are referred to as a basic block, which is a unit of process.

The control flow analysis refers to analyzing the control flow between basic blocks.

The data flow analysis refers to analyzing where a variable in each basic block is defined and referred to. The results of these analyses are used to obtain information on the living period of each variable.

The resource allocation unit 13 allocates variables in the intermediate program to either registers or memory of a processor which is the target machine for the program translating apparatus. In the allocation, the resource allocation unit 13 examines how the living periods of the variables are overlapped, and overlapped variables are allocated different registers. The resource allocation unit 13 further examines the number of levels of nesting of each variable or the frequency of use of each variable, and gives a priority level to each variable. Variables given higher priority levels are allocated the registers, and variables which are not allocated the registers due to their lower priority levels are allocated the memory.

The code generation unit 14 includes a generation code rewrite unit which generates machine instructions based on intermediate instructions of an intermediate program, thereby generating an assembler program which is decodable by the processor of the target machine, based on the intermediate program.

The relationship between a source program and an assembler program produced from the source program is explained with reference to FIG. 5.

FIG. 5 shows four functions: main, f1, f2, and f3 of the source program. A function call instruction f1(1); indicates that a function f1 is called with an argument of 1, and another function call instruction f3(2); indicates that a function f3 is called with an argument of 2.

The four functions of the assembler program: main, f1, f2, and f3 are composed of instructions with (ex1)–(ex5), instructions with (ex6)–(ex9), instructions with (ex10) (ex13), and instructions with (ex14)–(ex16), respectively.

The function call instruction f1(1); of the source program is rewritten into mov #1,D0 which is a move instruction to move immediate value 1 to register D0, and jsr _f1 which is a function call instruction.

The function call instruction f3(2); of the source program is rewritten into mov #2,D0 which is a move instruction to move immediate value 2 to register D0, and jsr __f3 which is a function call instruction.

The multiplication instruction b=a*3; of the source program is rewritten into mov #3,D1 which is a move instruction to move immediate value 3 to register D1, and mu1 D0,D1 which is a multiplication instruction.

All the registers D1 and D1 are 16-bit long, and stores 16-bit calculation results because the program translating apparatus of the present invention is intended for a 16-bit type processor and is standardized to make calculations and calculation results of the same bit length.

FIG. 6 shows a list of instructions to be used in the 16-bit type processor of the present invention.

Dn and Dm indicate general-purpose registers, MR indicates a return address/calculation register which stores a return address and high order bits of multiplication or division operation results, PC indicates a program counter value, and #imm indicates an immediate value.

A subroutine call instruction jsr __f is different from the subroutine call instruction used in the conventional processor in that the former stores the address of an instruction which follows the function call instruction in the return address/calculation register MR while the latter stores it in the return-address-only register.

A special return instruction rtsf is different from the special return instruction used in the conventional processor in that the former moves a return address from the return address/calculation register MR to the program counter while the latter moves it from the return-address-only register to the program counter.

An add instruction add Dn,Dm indicates that a value of register Dn and a value of register Dm are added and the add result is stored in register Dm.

A move instruction mov Dn,Dm indicates that data of register Dn are moved to register Dm.

A move instruction mov #imm,Dm, which has an immediate value as an operand indicates that #imm is moved to register Dm.

A multiplication instruction mu1 Dn,Dm indicates that a value of register Dn and a value of register Dm are multiplied, and the high order bits of the multiplication result are stored in the return address/calculation register MR and the low order bits are stored in register Dm.

Figure 7:
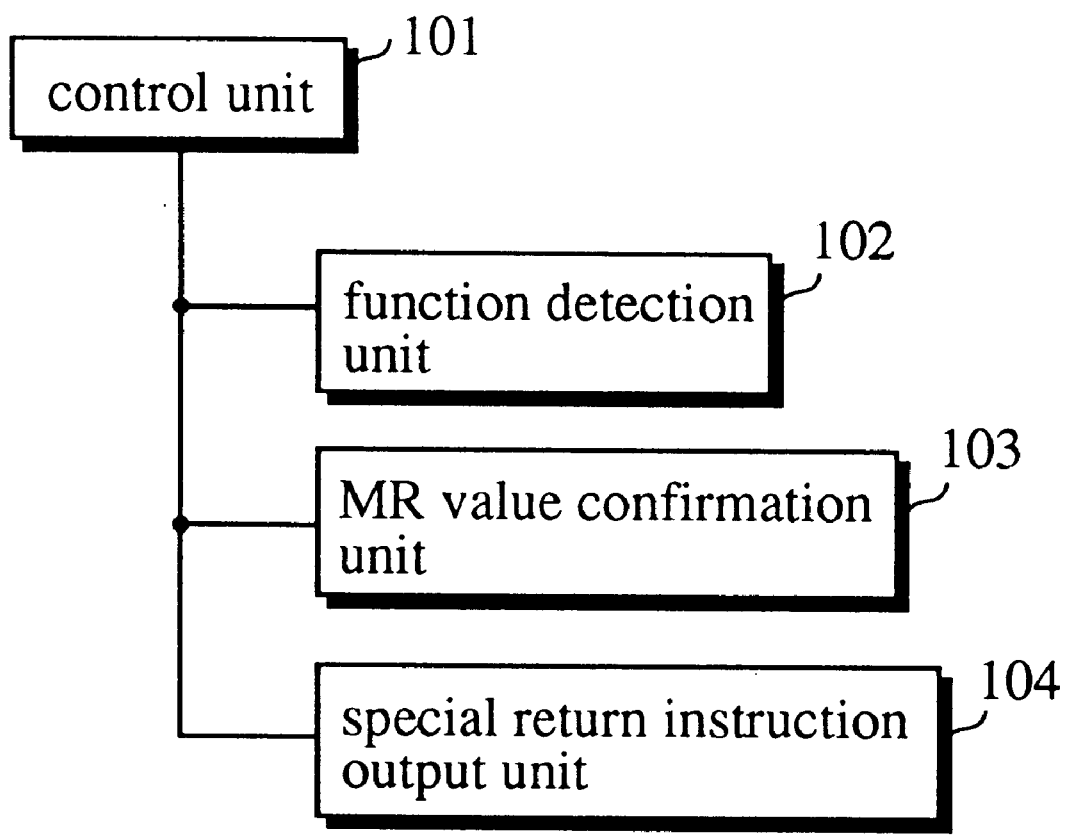
FIG. 7 shows the construction of the generation code rewrite unit provided in the code generation unit 14.

FIG. 7 shows the construction of the generation code rewrite unit provided in the code generation unit 14.

The generation code rewrite unit is composed of a control unit 101, a function detection unit 102, an MR value confirmation unit 103, and a special return instruction output unit 104.

The control unit 101 controls these units 102, 103, and 104 to be started in this order.

The function detection unit 102 detects functions which include no function call instruction from a program.

The MR value confirmation unit 103 detects the presence of a multiplication instruction, a division instruction, a residue calculation instruction, all of which indicate that the high order bits of calculation results are stored in the return address/calculation register MR, or a move instruction which indicates that data are moved to the return address/calculation register MR. The purpose of the detection is for the MR value confirmation unit 103 to confirm that the value of the return address/calculation register MR has not been updated.

The special return instruction output unit 104 rewrites a return instruction located at the end of a function which has been detected by the function detection unit 102 into a special return instruction.

The rewriting operation of the generation code rewrite unit will be explained hereinafter with reference to FIGS. 8–10.

FIG. 8 shows instructions of the assembler program shown in FIG. 5, which are stored in respective addresses on the memory.

Figure 10:
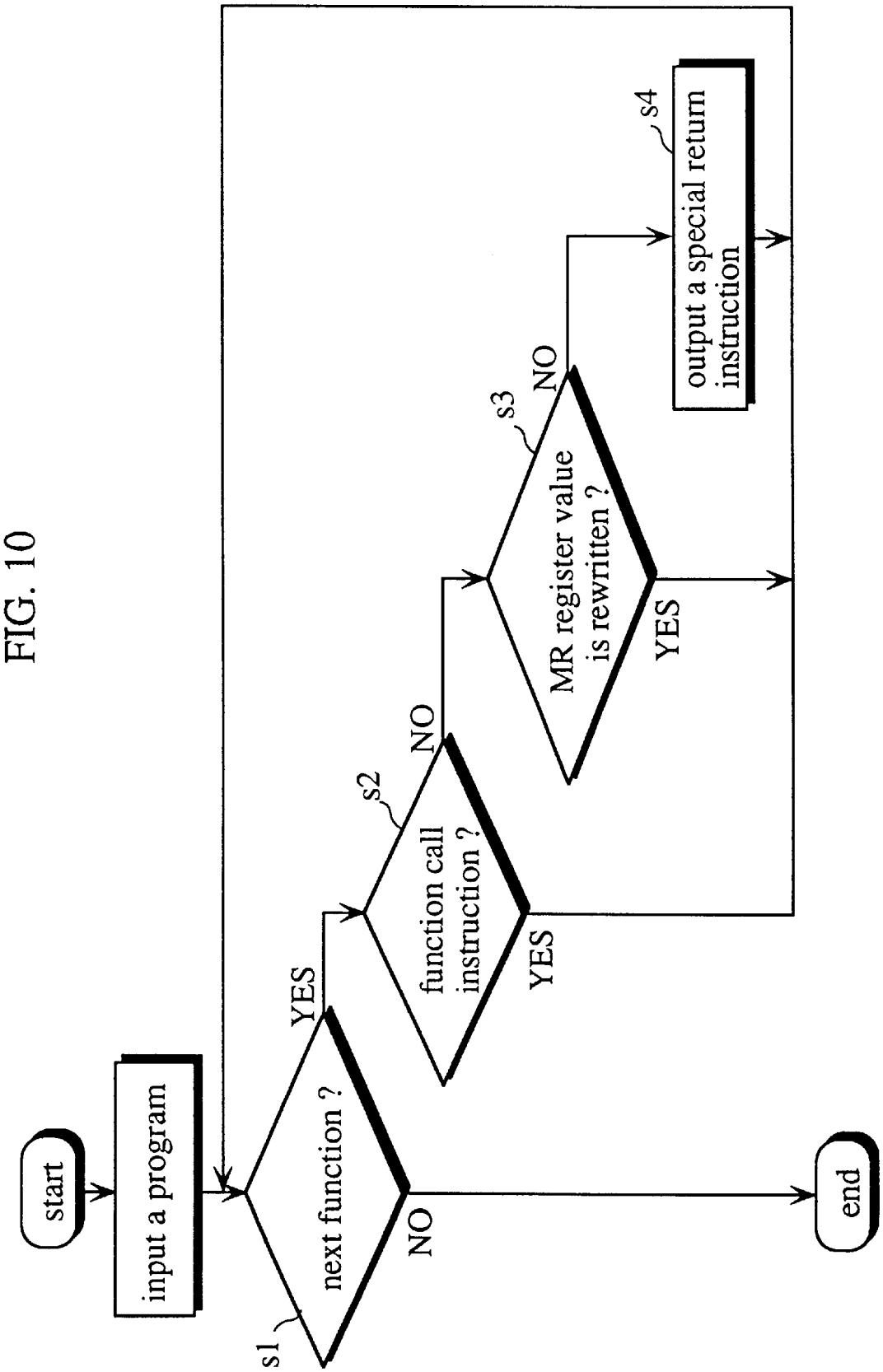
FIG. 10 shows a flowchart which depicts the rewriting operation of the generation code rewrite unit.

FIG. 10 shows a flowchart which depicts the operation for the generation code rewrite unit to rewrite the assembler program of FIG. 8.

At s1, whether there is a next function is detected. If it is, the process proceeds to s2 and otherwise terminates. In this case, the function detection unit 102 detects the entrance of the function __main, and the process proceeds to s2. At s2, whether the function includes a function call instruction is detected. If it does, the process returns to s1 and otherwise proceeds to s3. In this case, it is detected at s2 that the function includes function call instructions:jsr f1 and jsr __f3, and the process returns to s1.

Then, the presence of the next function f1 is detected at s1, the presence of a function call instruction:jsr __f2 is detected from instructions with (ex6)–(ex9) at s2, and the process returns to s1.

Then, the presence of the next function f2 is detected at s1, the absence of a function call instruction is detected from instructions with (ex10)–(ex13) at s2, and the process proceeds to s3. The function detection unit 102 starts the MR value confirmation unit 103.

At s3, the MR value confirmation unit 103 detects the presence of a calculation instruction whose calculation result is stored in the return address/calculation register MR, and determines whether the value of the return address/calculation register MR is updated. If such an instruction is present, the process returns to s1 and otherwise proceeds to s4. Since the function f2 includes the multiplication instruction:mu1 D0,D1, the process returns to s1.

Then, the presence of the next function f3 is detected at s1, the absence of a function call instruction is detected from instructions with (ex14)–(ex16) at s2, and the process proceeds to s3. The MR value confirmation unit 103 detects that there is no calculation instruction whose calculation result is stored in the return address/calculation register MR at s3, and the process proceeds to s4. At s4, the special return instruction output unit 104 is started and rewrites the final instruction with (ex16) of the function f3 into a special return instruction:rtsf with (ex16'). As a result, the assembler program shown on the left of FIG. 9 is generated.

Figure 11:
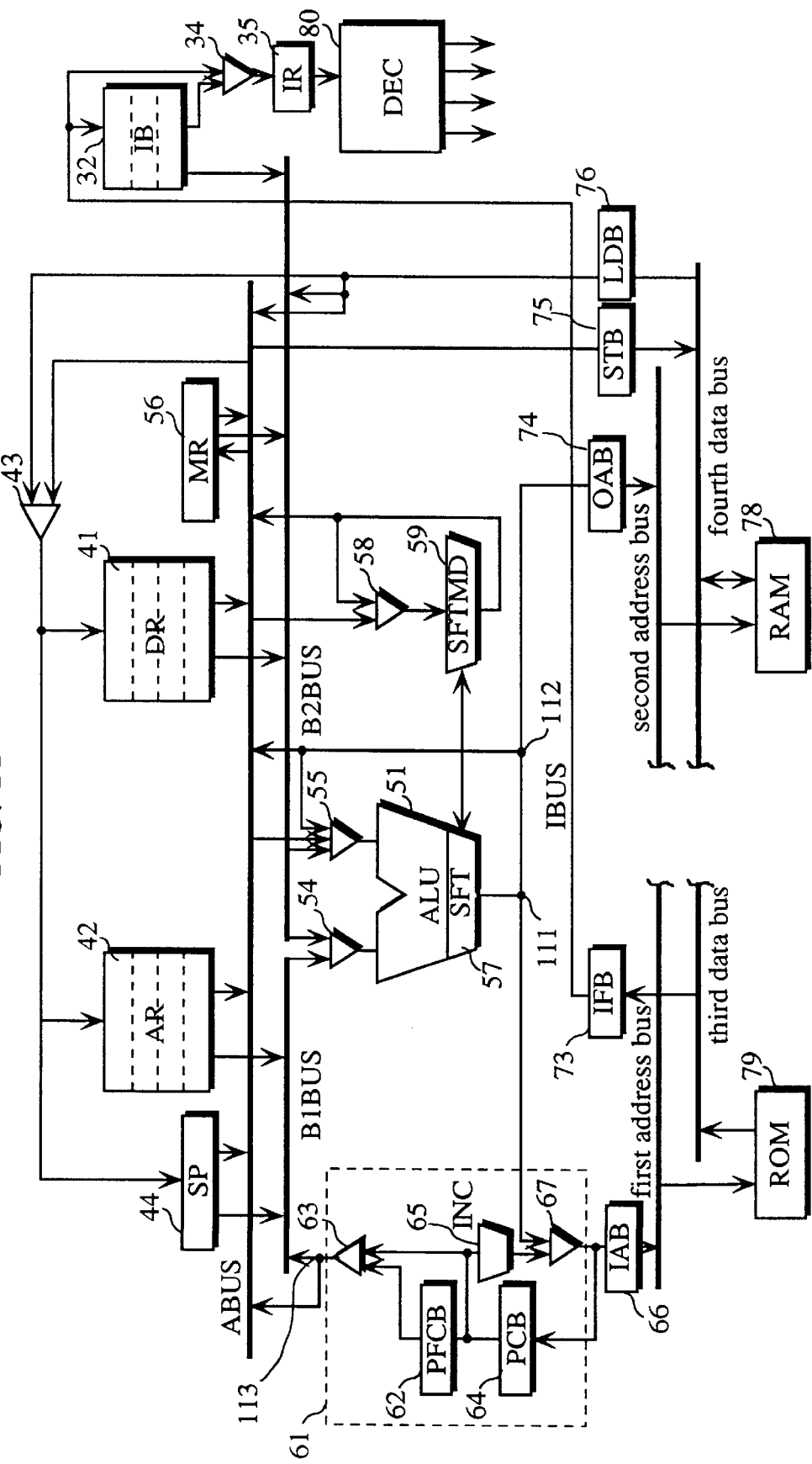
FIG. 11 shows the construction of the processor of the present invention.

FIG. 11 shows the construction of the processor of the present invention.

<The processor of the present embodiment>

FIG. 11 shows the construction of the processor of the present embodiment which is composed of an instruction buffer (IB) 32, a selector 34, an instruction register (IR) 35, a data register group 41, an address register group 42, a selector 43, a stack pointer 44, an ALU 51, selectors 54 and 55, a return address/calculation register (MR) 56, a shifter (hereinafter SFT) 57, a selector 58, a shifter (hereinafter SFTMD) 59, a program counter 61, an incrementor (INC) 65, an instruction address buffer (IAB) 66, a selector 67, an instruction fetch buffer (IFB) 73, an operand address buffer (OAB) 74, a store buffer (STB) 75, a load buffer (LDB) 76, a RAM 78, a ROM 79, and a decoder (hereinafter DEC) 80.

These units are connected via a bus (hereinafter ABUS), a first data bus (hereinafter B1BUS), a second data bus (hereinafter B2BUS), a third data bus, a fourth data bus, an instruction bus (hereinafter IBUS), a first address bus, and a second address bus.

The instruction buffer 32 with 8-bit length and 3 stages stores instructions which are fetched from the memory. For example, a function call instruction jsr _f1, or a multiplication instruction mu1 D0,D1 are stored in the instruction buffer 32 in the form of machine languages.

The selector 34 selects between an instruction from the instruction buffer 32 and an instruction from the IBUS.

The instruction register 35 holds an instruction which is outputted from the selector 34.

The data register group 41 consists of four 16-bit registers which mainly hold data.

The address register group 42 consists of four 16-bit registers which mainly hold addresses.

The selector 43 selects between an instruction from the ABUS and an instruction from the load buffer 76, and outputs an instruction selected either to the data register group 41, the address register group 42, or the stack pointer 44.

The stack pointer 44 holds the top address of an area which is used as a stack in the RAM 78.

The ALU 51 calculates 16-bit data and 16-bit addresses.

The selectors 54 and 55 each selects an operand to be inputted to the ALU 51.

The return address/calculation register 56 with 16-bit length holds the high order bits of the calculation result of a multiplication calculation or a division calculation, the residue of the residue calculation, and a return address.

When the processor of the present invention processes a machine program which has been produced by the program translating apparatus of the present invention, the frequency of use of the return address/calculation register 56 is very low. This is because C language is generally standardized to make calculation and calculation results of the same bit length, so that the program translating apparatus rounds 32-bit calculation results to be obtained from 16-bit multiplication calculations to 16-bit lengths so as to meet the 16-bit registers and buses. Although the processor of the present invention is 16-bit long, it may have other lengths.

The SFT 57 performs a shifting operation when it has received an output of the ALU 51. When the shifting operation is completed, the SFT 57 has the high order bits of a calculation result. When the calculation is a division operation, the SFT 57 has the quotient of the division operation.

The selector 58 selects between data on the ABUS and data from the SFTMD 59.

The SFTMD 59 performs a shifting operation when it has received an output of the selector 58. When the shifting operation is completed, the SFTMD 59 has the low order bits of the calculation result. When the calculation is a division operation, the SFTMD 59 has the residue of the division operation.

The program counter 61 is composed of a prefetch counter (PFCB) 62, a selector 63, and a program counter buffer (PCB) 64.

The prefetch counter 62 with 16-bit length holds the addresses of instructions to be fetched.

The program counter buffer 64 with 16-bit length holds a value of the prefetch counter 62 in one cycle behind the current cycle.

The selector 63 selects between data from the program counter buffer 64 and data from the prefetch counter 62, and outputs data selected either to the ABUS or the B1BUS.

The instruction address buffer 66 outputs the address of an instruction be fetched on a first address bus.

The instruction fetch buffer 73, the operand address buffer 74, the store buffer 75, and the load buffer 76 hold instructions, operand addresses, data to be stored, and data to be loaded, respectively.

The RAM 78 and the ROM 79 store data and instructions, respectively.

The ABUS is connected with the output terminal of each of the stack pointer 44, the data register group 41, the address register group 42, the SFTMD 59, the selector 63, the return address/calculation register 56, the load buffer 76, the ALU 51, and the SFT 57. The ABUS carries values of the stack pointer 44, the data register group 41, and the address register group 42 to the ALU 51. In addition, the ABUS carries a value of the return address/calculation register 56, which indicates a return address to the ALU 51.

The B1BUS is connected with the output terminal of each of the selector 63, the stack pointer 44, and the address register group 42, and further connected with the input terminal of the selector 54. The B1BUS carries a value of the selector 63 to the ALU 51.

The B2BUS is connected with the output terminal of each of the instruction buffer 32, the return address/calculation register 56, the data register group 41, and the load buffer 76, and further connected with the input terminal of each of the selectors 54 and 55, and the load buffer 76. The B2BUS carries part of an instruction stored in the instruction buffer 32, for example displacement in jsr @(disp, PC) to the ALU 51.

The processor of the present invention with the above-explained construction executes the instructions shown in FIG. 6 as follows.

<the function call instruction:jsr>

(1)SP-2->SP

A value of the stack pointer 44 is moved to the ALU 51 where SP←SP-2 is calculated, and the calculation result is carried on the ABUS to the selector 43 and to the stack pointer 44.

(2)the address of a next instruction->@SP

A value of the stack pointer 44 is carried on the second address bus via the operand address buffer 74. A value of the program counter buffer 64 is selected by the selector 63, carried on the ABUS to the RAM 78 via the store buffer 75, and stored on an address, which is indicated by the stack pointer 44. In other words, a return address is stored on the stack.

(3)the address of a next instruction->MR

A value of the program counter buffer 64 is selected by the selector 63, and carried on the ABUS to the return address/calculation register 56.

(4)#_f1(the address of f1)->PC

A value of the prefetch counter 62 is selected by the selector 63, and carried on the B1BUS to the ALU 51. The (disp) from the program counter 61 which is stored in the instruction buffer 32 is carried on the B2BUS to the ALU 51. The jump target address (PC+disp) which has been obtained in the ALU 51 is set at the program counter buffer 64 and the instruction address buffer 66. Then, all the instructions in the instruction buffer 32 are cleared.

<the execution of the return instruction:rts>

(1)@SP->PC

When the DEC 80 has decoded a return instruction, a value of the stack pointer 44 is carried on the second address bus to the RAM 78 via the ALU 51 and the operand address buffer 74.

As a result, a return address stored on the stack of the RAM 78 is carried on the fourth data bus and the ABUS to the program counter buffer 64 via the load buffer 76, the ALU 51, and the selector 67. At the same time, the return address is moved to the instruction address buffer 66, and all the instructions stored in the instruction buffer 32 are cleared.

(2)SP+2->SP

A value of the stack pointer 44 is carried on the ABUS to ALU 51 where SP←SP+2 is calculated. The calculation result is carried on the ABUS to the stack pointer 44 via the selector 43.

<the execution of the special return instruction:rtsf>

(1)MR->PC

When the DEC 80 has decoded a special return instruction, a return address stored in the return address/calculation register 56 is carried on the ABUS to the program counter buffer 64 via the ALU 51 and the selector 67. The return address is also moved to the instruction address buffer 66. At the same time, all the instructions in the instruction buffer 32 are cleared.

(2)SP+2->SP

A value of the stack pointer 44 is carried on the ABUS to the ALU 51 where SP+2 is calculated. The calculation result is carried on the ABUS to the stack pointer 44 via the selector 43.

<the execution of the multiplication instruction:mul>

When the DEC 80 has decoded a multiplication instruction, a value of the register Dn is carried on the B2BUS to the ALU 51, and a value of the register Dm is carried on the B1BUS to the ALU 51. These values are multiplied, and the high order bits and the low order bits of the multiplication result are stored in the SFT 57 and the SFTMD 59, respectively. The high order bits stored in the SFT 57 are carried on the ABUS to the return address/calculation register 56, while the low order bits stored in the SFTMD 59 are carried on the ABUS to the data register group 41 via the selector 43.

Figure 9:
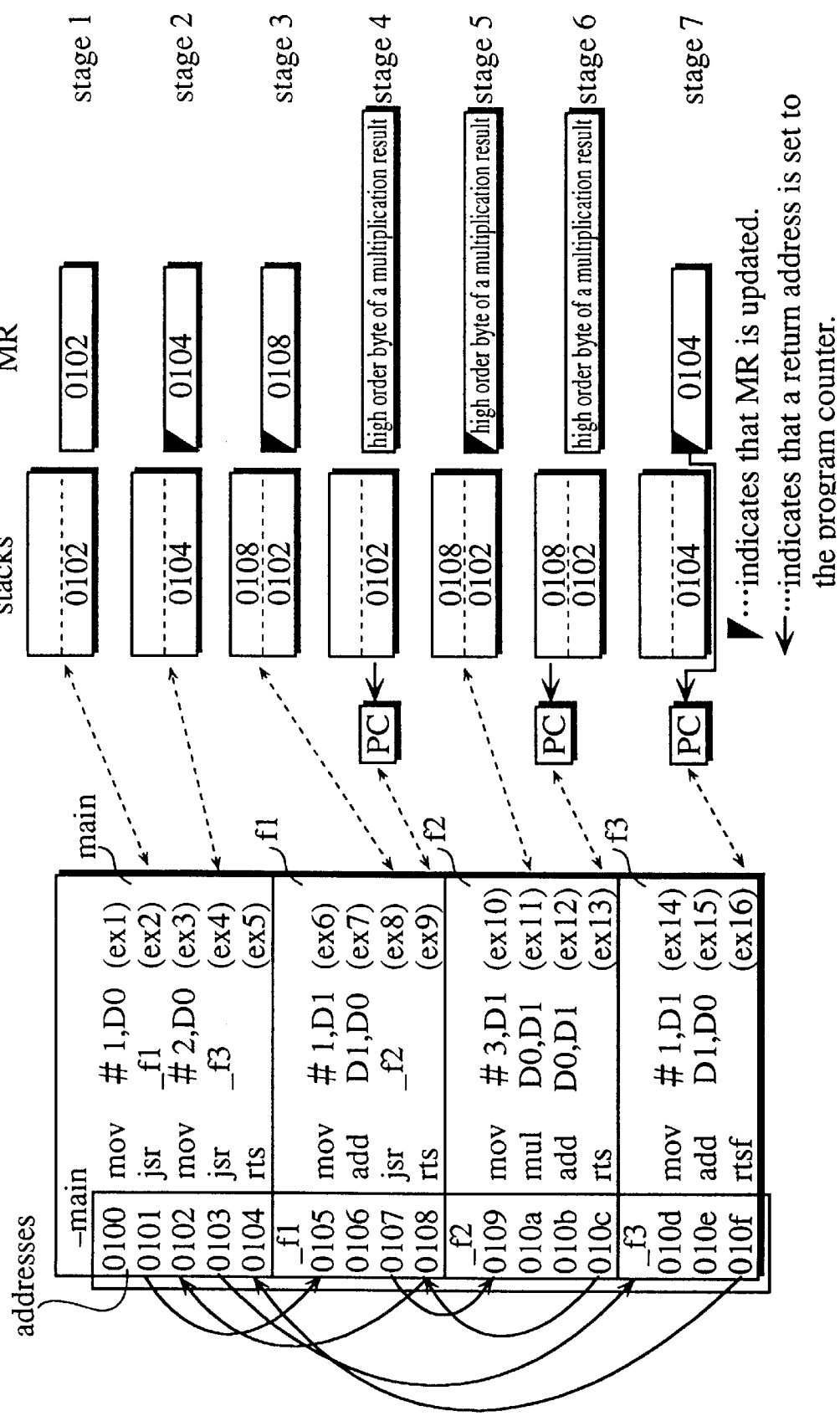
FIG. 9 shows how a machine language program including a special return instruction is executed.
Figure 12:
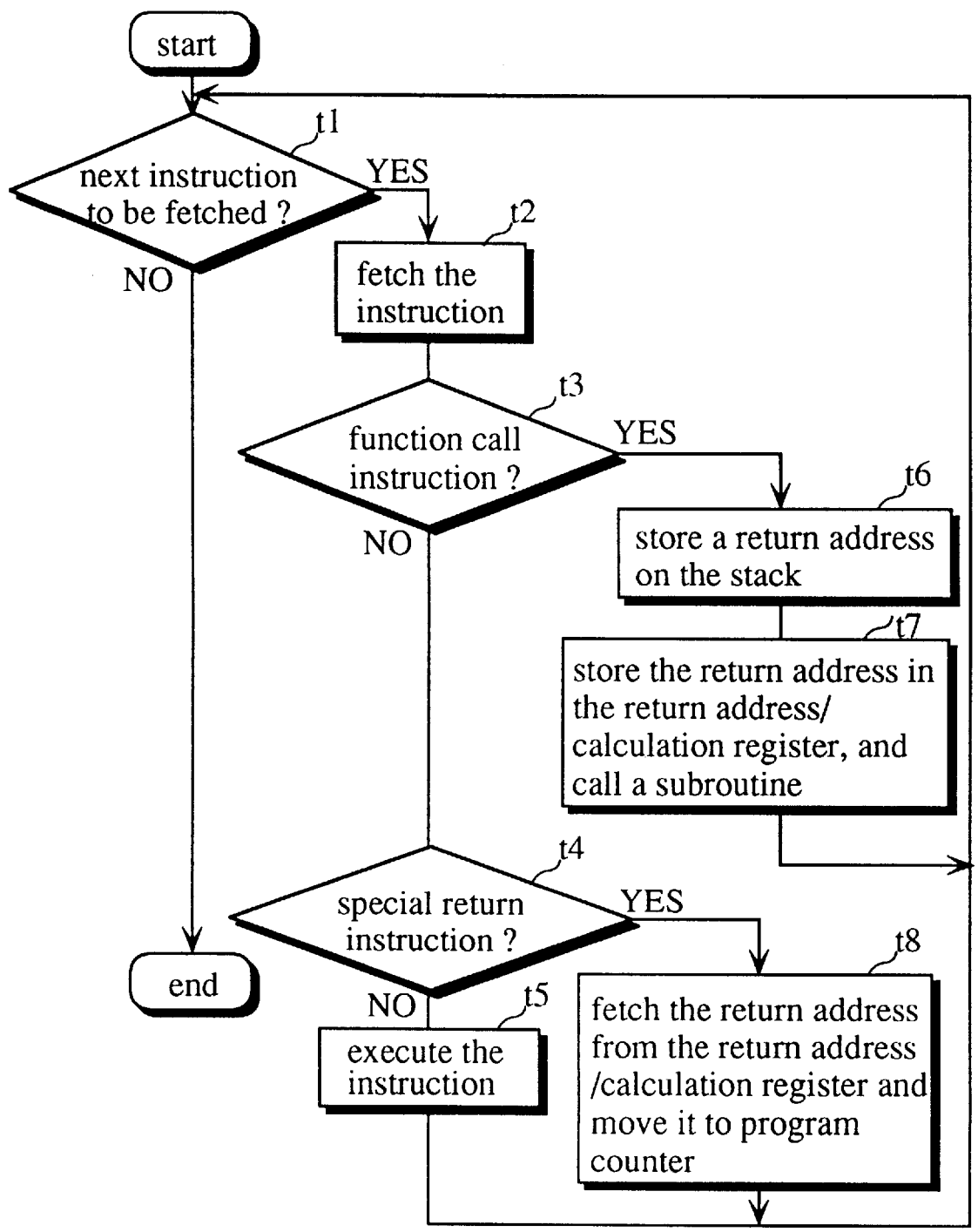
FIG. 12 shows a flowchart which depicts how the processor of the present invention calls a subroutine and returns from the subroutine.

The following is an explanation of calling a function and exiting from the function to return to an original program, with reference to FIGS. 9 and 12.

In FIG. 9, the full line arrows on the left indicate how the order of executing the instructions with (ex1)–(ex16) in the assembler program is changed. The four digit numbers in each box which represents the stack or the return address/calculation register 56 indicate return addresses to be stored when a function is called.

<A value setting of the program counter 61 and clearing instructions>

When the process is started, the top address of a program is set both to the program counter buffer 64 and the instruction address buffer 66. The top address which has been set in the instruction address buffer 66 is carried on the first address bus to the ROM 79, and the top instruction is fetched from the ROM 79.

A value of the program counter buffer 64 is sent to the incrementor 65 where the value is incremented byte by byte or 2 bytes by 2 bytes depending on the address. The incremented value is returned to the program counter buffer 64 and also set to the instruction address buffer 66. At the same time, the value of the program counter buffer 64 before the increment is moved to the prefetch counter 62. This is how a value of the program counter buffer 64 is updated every time it is sent to the incrementor 65, and as s result, a machine program in the ROM 79 is read into the instruction buffer 32.

When the instruction buffer 32 has no instruction because a program has not been started or a branch instruction is being executed, the initial one-byte instruction is carried on the IBUS directly to the instruction register 35.

The address buses and the data buses are all 16-bit long and the instruction buffer 32 is 8-bit long, so that a one-byte instruction is stored in the instruction buffer 32 every time the program counter value is incremented by one, while a two-byte instruction is stored in the instruction buffer 32 every time the program counter value is incremented by two (t2).

The top instruction stored in the instruction buffer 32 is moved to the instruction register 35, and further moved to the DEC 80 where it is decoded. The other instructions stored in the instruction buffer 32 is moved to the instruction register 35 on a First In-First Out basis.

When an address with no instruction is set in either the program counter buffer 64 or the instruction address buffer 66, or when an instruction which indicates a program termination is written, the process is terminated (t1).

<the instruction with (ex1): mov #1,D1>

When the execution of a program is started, the top address 0100 is set in the program counter buffer 64 and the instruction address buffer 66. The top address which has been stored in the instruction address buffer 66 is moved on the first address bus, and the instruction: mov #1,D1 which corresponds to the top address 0100 is fetched. It is determined at t3 whether the instruction fetched is a function call instruction.

Since the instruction fetched is not a function call instruction but a move instruction, it is further determined at t4 whether the instruction is a special return instruction. Since the instruction is not a special return instruction, it is executed at t5. After the execution, the value of the program counter buffer 64 becomes 0101, and the function call instruction with (ex2):jsr _f1 which corresponds to the address 0101 is fetched at t2.

<the function call instruction with (ex2):jsr _f1>

When the instruction with (ex2) has been fetched, the instruction buffer 32 is filled with 3-byte machine codes of this instruction. To be more specific, the instruction buffer 32 has the operation code (jsr) of the instruction on its first stage, the low order 8 bits of a jump target address or of the (disp) from the program counter buffer 64 on its second stage, and the high order 8 bits of the jump target address or of the (disp) from the program counter buffer 64 on its third stage.

When the instruction buffer 32 has been thus filled with the machine language codes of a function call instruction, the operation code is moved to the DEC 80 via the instruction register 35. The DEC 80 determines that the instruction is a function call instruction at t3. Then, a value of the stack pointer 44 is moved to the ALU 51 where SP←SP-2 is calculated, and the calculation result is moved to the stack pointer 44.

Then, a value of the stack pointer 44 is carried on the second address bus to designate an area in the RAM 78. The address of the next instruction in the program counter buffer 64 is stored in the area. Thus, a return address is stored in the stack at t6.

Then, the address stored in the area is moved to the return address/calculation register 56. As a result, the contents of the stack and the return address/calculation register 56 are as shown on the stage 1 of FIG. 9.

When the DEC 80 is decoding the 1-byte function call instruction of the instruction register 35, a 2-byte jump target address of the function call instruction is stored in the instruction buffer 32. Then, the jump target address is found from the value of the instruction buffer 32 and the PC, and is set on the program counter buffer 64 and the instruction address buffer 66. As a result, a function is called, and all the instructions which follow the function call instruction in the instruction buffer 32 are cleared at t7.

<the instructions with (ex6)–(ex12)>

The instruction with (ex6): mov #1,D1 and the instruction with (ex7): add D0,D1 are fetched and executed in order at t1–t5.

The next instruction with (ex8): jsr _f2 is fetched at t2 and determined to be a function call instruction at t3. The address of the next instruction with (ex9), that is, PC+1= 0107+1=0108 is stored in the stack as a return address at t6, and the return address 0108 is also stored in the return address/calculation register 56. As a result, the contents of the stack and the return address/calculation register 56 are as shown at stage 3 of FIG. 9.

After the storage of the return address 0108, the jump target address (PC+disp(0002)) is calculated and the calculation result (0109) is moved to the program counter 61 at t7.

Then, the execution of the function f2 is started. First, the instruction with (ex10): mov #3,D1 is fetched and executed, and then, the instruction with (ex11):mu1 D0,D1 is fetched and moved to the DEC 80. Having decoded the multiplication instruction with (ex11), the DEC 80 carries a value of the register Dn on the B2BUS to the ALU 51, and a value of the register Dm on B1BUS to the ALU 51. The ALU 51 multiplies these values, and the high order bits and the low order bits of the multiplication result are stored in the SFT 57 and the SFTMD 59, respectively.

The high order bits stored in the SFT 57 are carried on the ABUS to the return address/calculation register 56, while the low order bits stored in the SFTMD 59 are carried on the ABUS to the data register group 41 via the selector 43. As a result, the contents of the stack and the return address/ calculation register 56 are shown at stage 5 of FIG. 9.

Then, the instruction with (ex12): add D0,D1 is fetched and executed, and the next instruction with (ex13) is fetched.

<the instruction with (ex13):rts>

Since the instruction with (ex13) is a return instruction, the value of the stack pointer 44 is carried on the second address bus to the RAM 78 via the ALU 51 and the operand address buffer 74. As a result, the return address 0108 stored in the stack is carried on the fourth data bus to the ALU 51 via the load buffer 76, and further carried on the ABUS to the program counter buffer 64 via the selector 67. The return address 0108 is also moved to the instruction address buffer 66, and all the instructions after the return instruction with (ex13) stored in the instruction buffer 32 are cleared. The move of the return address 0108 is indicated by the full line arrow at stage 6 of FIG. 9.

After the clearance of the instructions, the value of the stack pointer 44 is carried on the ABUS to the ALU 51 where SP←SP+2 is calculated. The calculation result is carried on the ABUS the stack pointer 44 via the selector 43. Thus, the program exits from the function f2 and returns to the function f1, and the instruction with (ex9) whose address is 0108.

<The instructions with (ex9)–(ex15)>

Since the instruction with (ex9) is a return instruction, the stack is accessed again to fetch the return address 0102. The return address 0102 is moved to the program counter 61. The contents of the stack and the return address/calculation register 56 are shown at stage 4 of FIG. 9. After the movement, the instruction with (ex3) whose address is 0102 is fetched and executed.

After the execution of the instruction with (ex3), the instruction with (ex4) whose address is 0103 is fetched. Since the instruction with (ex4) is a function call instruction, the address of the next instruction with (ex5), that is 0104, is stored as a return address to the return address/calculation register 56 at stage 2. A jump target address (PC+disp) is calculated and the program proceeds to the function _f3 at t6 and t7. Then, the instructions with (ex14) and (ex15) are fetched and executed at t1–t5, and the next instruction with (ex16) is fetched.

<The special return instruction with (ex16):rtsf>

When the DEC 80 has decoded the special return instruction with (ex16) whose address is 010f, the return address stored in the return address/calculation register 56, that is 0104, is carried on the ABUS to the ALU 51, further to the program counter buffer 64 via the selector 67. The return address is also moved to the instruction address buffer 66. The contents of the stack and the return address/calculation register 56 are shown at stage 7 of FIG. 9.

As a result, the program exits from the function f1 and returns to the function main. All the instructions after the return instruction with (ex16) in the instruction buffer 32 are cleared.

The value of the stack pointer 44 is carried on the ABUS to the ALU 51 where SP+2 is calculated. The calculation result is carried on ABUS to the stack pointer 44 via the selector 43. This is indicated by the full line arrow at stage 7 of FIG. 9. Thus, the return address is moved from the return address /calculation register 56 to the program counter 61, and the program is returned to the function main.

As explained hereinbefore, the processor of the present invention has achieved the reduction of the number of access to the stack without providing a register specifically designed to store a return address.

In the present invention, a return address is stored in the return address/calculation register, which is provided to store the high order bits of the calculation results of a multiplication operation, a division operation, or a residue operation; however, the return address may be stored in another register such as one which is provided to store the high order bits of the results of an add operation, a subtract operation, or a shift operation.

Instead of the return address/calculation register, a register which is provided for calculations for a different bit length from the calculator of the processor may be used as long as the register has a low frequency of use. For example, instead of the ALU 51 of the processor of the present invention which has a 16-bit length, a register for 32- or 64-bit calculations may be used because they generally have low frequency of use.

Instead of a register for storing the high order bits of calculation results, a register for storing the low order bits of the calculation results may be used to store a return address.

Although the return address/calculation register of the present invention has a single stage, three or four stages may be provided to store three or four return addresses. In this case, the generation code rewrite unit detects the presence of all the functions whose nest levels are smaller than the number of stages of the register, and rewrites return instructions in the functions detected into special return instructions. As a result, a plurality of return addresses are stored in the single return address/calculation register.

In the embodiment, a return instruction is rewritten into a special return instruction after an assembler program has been generated; however, the process may be modified as shown in the following (a) and (b).

(a) An optimization unit is designed to store a flag in association with each function written in an intermediate language, and to detect all the functions capable of outputting special return instructions from the program.

The optimization unit sets the flag at on for the functions detected, and sets the flag at of for the functions which have not been detected.

After these operations of the optimization unit, a code generation unit generates a subroutine which includes a special return instruction at its bottom for each function detected, and further generates a subroutine which includes a return instruction at its bottom for each function which has not been detected.

(b) An optimization unit detects a function written in an intermediate language which can output a special return instruction, and writes an intermediate language instruction which indicates the capability of outputting a special return instruction to the bottom of the function detected.

Then, a code generation unit generates a subroutine which includes a special return instruction at its bottom for each function which includes the intermediate language instruction. The code generation unit, on the other hand, generates a subroutine which includes a return instruction at its bottom for each function which does not include the intermediate language instruction.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A processor which executes a machine language program including a plurality of subroutines, the processor comprising:

a special register for storing one of the return address and a calculation result upon execution of a predetermined calculation instruction;

an address hold unit for holding a fetch address in the machine language program;

a call means, when calling one of the plurality of subroutines, for storing a call address indicated by a subroutine call instruction into the address hold unit, for storing an address of an instruction which follows the subroutine call instruction as the return address into a stack area, and also for storing the same return address into the special register; and return means for prioritizing a storing of the return address from the special register into the address hold unit over a storing of the return address from the stack area when a return is performed from one of said plurality of subroutines unless a calculation result has been overwritten into the special register whereby the return means stores the return address from the stack area into the address hold unit.

2. The processor of claim 1, wherein one of said plurality of subroutines that includes at least one of, the subroutine call instruction for calling another subroutine and the predetermined calculation instruction, further includes a first subroutine return instruction that indicates the return address has been overwritten, wherein another one of said plurality of subroutines that includes neither the subroutine call instruction nor the predetermined calculation instruction includes a second subroutine return instruction that indicates that the return address has not been overwritten, wherein the return means determines whether one of the first and second subroutine return instruction is present and stores the return address from the stack area into the address hold unit when returning from the subroutine that includes the first subroutine return instruction, and stores the return address from the special register into the address hold unit when returning from the subroutine that includes the second subroutine return instruction.

3. The processor of claim 2 further including a calculator, wherein the special register stores a calculation result of one of a multiplication operation, a division operation, and a remainder operation of the calculator.

4. The processor of claim 2 further including a calculator, wherein the special register stores a calculation result whose bit length is longer than a bit length of the calculator.

5. The processor of claim 2 further including a calculator, wherein the special register stores one of high order bits or lower order bits of the calculation result of the calculator.

6. A program translating apparatus for translating a first program having a plurality of subroutines that are written in a programming language into a machine language which is executable for a processor with a return address being stored in a stack area for each of said subroutines, the processor comprising:

a special register for storing one of the return address and a calculation result upon execution of a predetermined calculation instruction;

an address hold unit for holding a fetch address in the machine language program;

a call means, when calling one of the plurality of subroutines, for storing a call address indicated by a subroutine call instruction into the address hold unit, for storing an address of an instruction which follows the subroutine call instruction as the return address into the stack area, and also for storing the same return address into the special register;

overwriting means for overwriting the return address stored in the special register with the calculation result when the predetermined calculation instruction is executed in one of said subroutines;

return means for determining whether one of a first and second subroutine return instruction is present and storing the return address from the stack area into the address hold unit when returning from one of said subroutines that includes the first subroutine return instruction, and for storing the return address from the special register into the address hold unit when returning from one of said subroutines that includes the second subroutine return instruction;

the program translating apparatus comprising
a detection means for detecting one of said subroutines from the first program that includes neither a subroutine call instruction for calling another subroutine nor the predetermined calculation instruction, and upon making a detection, indicating that the return address in the special register in said one of said subroutines has not been overwritten; and
translation means for translating one of said subroutines into a machine language subroutine that includes the second subroutine return instruction, indicating that the return address in the special register has not been overwritten, when one of said subroutines is detected by the detector means, and translating one of said subroutines into a machine language subroutine that includes the first subroutine return instruction, indicating that the return address in the special register has been overwritten, when one of said subroutines is not detected by the detector means.

7. The program translating apparatus of claim 6 further comprising an appending means for appending special information to each one of said subroutines detected by the detection means, wherein the translation means translates each one of said subroutines with the special information into a machine language subroutine that includes the second subroutine return instruction and for translating every other one of said subroutines into a machine language subroutine that includes the first subroutine return instruction.

8. The program translating apparatus of claim 7, wherein the predetermined calculation instruction is one of a multiplication instruction, a division instruction, and a remainder instruction.

9. The program translating apparatus of claim 7 further comprising a calculator, wherein a bit length of the predetermined calculation result is longer than a bit length of the calculator.

10. A program development system comprising a processor and a program translating apparatus for translating a first program having a plurality of subroutines which are written in a programming language into a machine language which is executable using the processor with a return address being stored in a stack area for each of said subroutines, the processor comprising:
a special register for storing one of the return address and a calculation result upon execution of a predetermined calculation instruction;
an address hold unit for holding a fetch address in the machine language subroutine;
a first transmission path being connected to the processor and the stack area;
a second transmission path being connected to the special register and the address hold unit;
a call means for storing, when an instruction is a subroutine call instruction, a call address included in a subroutine call instruction into the address hold unit, for outputting an address of an instruction which follows the subroutine call instruction as the return address to the first transmission path to store the return address into the stack area, and for outputting the same return address to the second transmission path to store the return address into the special register;
overwriting means for overwriting the return address stored in the special register with the calculation result when the predetermined calculation instruction is executed in one of said subroutines;
a return means for outputting the return address stored in the stack area to the first transmission path to store the return address into the address hold unit when returning from one of said subroutines that includes a first subroutine return instruction, and for outputting the return address stored in the special register to the second transmission path to store the return address into the address hold unit when returning from one of said subroutines including a second return instruction;
the program translating apparatus including
a detection means for detecting one of said subroutines from the first program that includes neither a subroutine call instruction for calling another subroutine nor the predetermined calculation instruction, and upon making a detection, indicating that the return address in the special register in said one of said subroutines has not been overwritten; and
translation means translating said one of said subroutines into a machine language subroutine that includes the second subroutine return instruction, indicating that the return address in the special register has not been overwritten, when said one of said subroutines is detected by the detector means, and translating said one of said subroutines into a machine language subroutine that includes the first subroutine return instruction indicating that the return address in the special register has been overwritten, when said one of said subroutines is not detected by the detector means.

11. The program development system of claim 10, wherein the predetermined calculation instruction is one of a multiplication instruction, a division instruction, and a remainder instruction.

12. The program development system of claim 10 further comprising a calculator, wherein a bit length of the calculation result is longer than a bit length of the calculator.

13. A program recording medium for recording a machine language program including a plurality of subroutines that is executed by a processor with a return address being stored in a stack area for each of said subroutines, the processor comprising:
a special register for storing one of the return address and a calculation result upon execution of a predetermined calculation instruction;
an address hold unit for holding a fetch address in the machine language program;
a call means for storing, when calling one of the plurality of subroutines, a call address indicated by a subroutine call instruction into the address hold unit, for storing an address of an instruction which follows the subroutine call instruction as the return address into the stack area, and also for storing the same return address into the special register;
overwriting means for overwriting the return address stored in the special register with the calculation result when the predetermined calculation instruction is executed in one of said subroutines;
a return means for storing the return address stored in the stack area into the address hold unit when the instruction being processed is a first subroutine return instruction, and for storing the return address stored in the special register into the address hold unit when the instruction being processed is a second subroutine return instruction;
the machine language program comprising
a first subroutine which includes at least one of the subroutine call instruction and the predetermined calculation instruction also includes the first subroutine return instruction, indicating that the return address in the special register has been overwritten; and a second subroutine which includes neither the subroutine call instruction nor the predetermined calculation instruction also includes the second subroutine return instruction, indicating that the return address in the special register has not been overwritten.

14. A method for rewriting a computer program to run more efficiently on a processor having a register normally used to store a calculation result of a predetermined calculation instruction, the method comprising the steps of:

writing an instruction to store a return address in both a stack area and the register when executing a subroutine call instruction;

detecting each subroutine from the computer that includes neither the subroutine call instruction for calling another subroutine nor the predetermined calculation instruction for storing the calculation result into the register;

translating each detected subroutine into a subroutine which includes a second subroutine return instruction, instruction indicating the return address in the register has not been overwritten; and translating every other subroutine into a subroutine which includes a first subroutine instruction, indicating that the return address in the register has been overwritten with one of a return address of another subroutine and the calculation result of the predetermined calculation.

15. A machine readable medium storing data that enables a processor for executing a machine language program to read addresses from one of a stack area and a designated special register when the machine language program includes a first subroutine that includes one of a predetermined calculation instruction and/or a subroutine call instruction and a second subroutine that has neither a predetermined calculation instruction nor a subroutine call instruction, comprising:

first instruction data for directing the processor to write a return address during an execution of a subroutine into the stack area and the designated special register;

second instruction data for directing the processor to overwrite the address stored in the designated special register when a first subroutine is executed; and detection data for determining when the machine language program includes a first subroutine to direct the processor to read the return address from the stack area and for determining when the machine language program includes a second subroutine to direct the processor to read the return address from the special register, whereby the reading of the return address from the designated special register is performed at higher speed than from the stack area.

16. A processor which executes a machine language program including a plurality of subroutines, the processor comprising:

a stack access means for accessing a stack area to store a return address during an execution of one of said subroutines;

a special register for storing one of the return address and a calculation result upon execution of a predetermined calculation instruction;

an address hold unit for holding a fetch address in the machine language program;

a call means, when calling one of the plurality of subroutines, for storing a call address indicated by a subroutine call instruction into the address hold unit, for storing through the stack access means an address of an instruction which follows the subroutine call instruction as the return address into the stack area, and also for storing the same return address into the special register; and return means for prioritizing a storing of the return address from the special register into the address hold unit over a storing of the return address from the stack area when a return is performed from one of said plurality of subroutines unless a calculation result has been overwritten into the special register whereby the return means stores the return address from the stack area into the address hold unit.

17. A processor which executes a machine language program including a plurality of subroutines for storing addresses during an execution of one of said subroutines, comprising:

a designated register for storing one of a return address and a calculation result upon execution of a predetermined calculation instruction;

an address hold unit for holding a fetch address in the machine language program;

a call means, when calling one of the plurality of subroutines, for storing a call address indicated by a subroutine call instruction into the address hold unit, for storing an address of an instruction which follows the subroutine call instruction as the return address into a stack area, and also for storing the same return address into the designated register; and return means for prioritizing a storing of the return address from the designated register into the address hold unit over a storing of the return address from the stack area when a return is performed from one of said plurality of subroutines unless a calculation result has been overwritten into the designated register whereby the return means stores the return address from the stack area into the address hold unit.

* * * * *